(12) United States Patent
Donahue et al.

(10) Patent No.: US 11,155,001 B2
(45) Date of Patent: Oct. 26, 2021

(54) PANEL CUTTER WITH EFFICIENT AND EFFECTIVE CLAMPING SYSTEM

(71) Applicants: Brian Donahue, New Richmond, WI (US); Vance Rades, Andover, MN (US)

(72) Inventors: Brian Donahue, New Richmond, WI (US); Vance Rades, Andover, MN (US)

(73) Assignee: Safety Speed Cut Manufacturing Co., Inc., Ham Lake, MN (US)

( * ) Notice: Subject to any disclaimer, the term of this patent is extended or adjusted under 35 U.S.C. 154(b) by 0 days.

(21) Appl. No.: 16/361,179

(22) Filed: Mar. 21, 2019

(65) Prior Publication Data
US 2019/0291293 A1    Sep. 26, 2019

Related U.S. Application Data

(60) Provisional application No. 62/646,350, filed on Mar. 21, 2018.

(51) Int. Cl.
*B27B 5/07* (2006.01)
*B23D 47/04* (2006.01)
(Continued)

(52) U.S. Cl.
CPC .............. *B27B 5/07* (2013.01); *B23D 47/04* (2013.01); *B26D 7/025* (2013.01); *B27B 5/29* (2013.01)

(58) Field of Classification Search
CPC .. B27B 5/07; B27B 5/06; B27B 5/061; B27B 5/065; B27B 27/02; B27B 5/184; B27B 5/187; B27B 5/29; B27B 5/075; B23D 51/02; B23D 51/04; B23D 47/02; B23D 47/04; B23D 45/003; B23D 45/02;
(Continued)

(56) References Cited

U.S. PATENT DOCUMENTS 2,095,037 A * 10/1937 Reintjes ................... E04B 2/58
52/474
2,818,892 A *  1/1958 Price ......................... B27B 5/07
83/454
(Continued)

FOREIGN PATENT DOCUMENTS

EP    0 345 691 A1 * 12/1989
GB      844880    *  8/1960
(Continued)

*Primary Examiner* — Evan H MacFarlane
(74) *Attorney, Agent, or Firm* — Craig J. Lervick; Larkin Hoffman Daly & Lindgren Ltd.

(57) ABSTRACT

A panel cutter has a clamping mechanism positioned adjacent to the cutting path to hold the panel material in position during the cutting process. The clamping mechanism includes a clamping bar which is removably coupled to a pair of lever mechanisms which are rotatably coupled to the framework of the panel cutter. An actuator bar having cams at both ends is also coupled to the framework and position adjacent to the lever arms, wherein movement of the actuator bar causes movement of the lever arms. Based upon the configuration and positioning of these components, movement of the lever arms causes the clamping bar to move between a locked position and an unlocked position.

15 Claims, 4 Drawing Sheets

(51) Int. Cl.
*B27B 5/29* (2006.01)
*B26D 7/02* (2006.01)

(58) Field of Classification Search
CPC .. B23D 45/021; B23D 45/022; B23D 45/027; B23D 1/08; B23D 59/00; B23D 59/001; Y10T 83/7697; Y10T 83/8763; B26D 7/01; B26D 7/015; B26D 7/02; B26D 7/025
See application file for complete search history.

(56) References Cited

U.S. PATENT DOCUMENTS

| | | | | |
|---|---|---|---|---|
| 3,213,908 A | * | 10/1965 | Schutz | B27B 5/07 83/455 |
| 3,945,285 A | * | 3/1976 | Gebhardt | B27B 5/07 83/437.3 |
| 4,215,731 A | * | 8/1980 | Maynard | B23Q 9/0078 144/136.95 |
| 4,291,602 A | * | 9/1981 | Fast | B23Q 9/0014 83/574 |
| 4,802,399 A | * | 2/1989 | Olson | B23D 47/02 384/55 |
| 4,892,020 A | * | 1/1990 | Kozyrski | B27B 5/07 225/96.5 |
| 5,253,400 A | * | 10/1993 | Conachen | B23Q 1/621 144/1.1 |
| 8,499,671 B2 | * | 8/2013 | Learnard | B23D 47/04 83/468 |
| 2016/0129508 A1 | * | 5/2016 | Stone | B27B 5/07 83/574 |

FOREIGN PATENT DOCUMENTS

| | | | |
|---|---|---|---|
| GB | 885799 | * | 12/1961 |
| GB | 1058958 | * | 2/1967 |
| GB | 1151522 | * | 5/1969 |
| JP | H 0412802 | * | 1/1992 |

* cited by examiner

PANEL CUTTER WITH EFFICIENT AND EFFECTIVE CLAMPING SYSTEM

BACKGROUND

Mechanisms that can effectively and efficiently cut large panels are used in many different applications, including lumber yards, retail stores selling lumber and/or building materials, cabinet shops, sign fabricators, and other woodworking shops. One example of a panel saw is shown and disclosed in U.S. Pat. No. 4,802,399 "PANEL SAW APPARATUS", issued on Feb. 7, 1989 to Olson. As shown in the Olson patent, this apparatus can easily make large cuts in a very controlled manner. That said, the device of Olson is primarily directed toward cutting plywood or other hard panel materials.

SUMMARY OF THE INVENTION

To provide a cutting apparatus that efficiently cuts panel materials, a cutting mechanism and related clamping system are configured to uniquely cooperate with one another. Generally speaking, the vertical panel cutter includes a support framework designed to support and orient a panel of material to be cut in a substantially vertical manner. The cutting mechanism is carried on a carriage, which is guided along a predetermined cutting path, with the carriage being slidably coupled to a pair of guide rails. In an effort to provide more efficient and effective cutting, the related clamping system includes a clamping bar which extends adjacent to and parallel with the cutting path, and which is movable between a locked or holding position and an unlocked or open position. The clamping bar is supported at an upper and lower end by respective lever mechanisms, which accommodate the movement between the two stated positions. Each lever mechanism is rotatably attached to the framework of the panel cutter at an appropriate position. An actuator arm is also attached to the framework and carries a pair of cams on either end which also cooperate with the lever mechanism. In operation, the actuator arm is rotated, thus causing interaction between the cams and the lever mechanism. Due to the orientation and configuration of these components, the lever mechanism will then move the clamp bar between the two desired positions. In this manner, clamping/holding of the panel material can be easily accomplished by the simple movement of the lever and related rotation of the actuator arm.

BRIEF DESCRIPTION OF THE DRAWINGS

The further details and advantages of the preferred embodiments can be seen from the following description of the preferred embodiments in conjunction with the drawing, in which.

DESCRIPTION

As illustrated in FIGS. 1-6, and generally discussed below, a newly designed panel saw clamping mechanism is presented which is particularly useful in the sign industry. That said, the same mechanism could be applied to other systems and applications. As will be appreciated from the details outlined below, certain elements of the panel saw apparatus are not shown in the attached figure, so that an improved clamping mechanism can be better illustrated.

Figure 1:
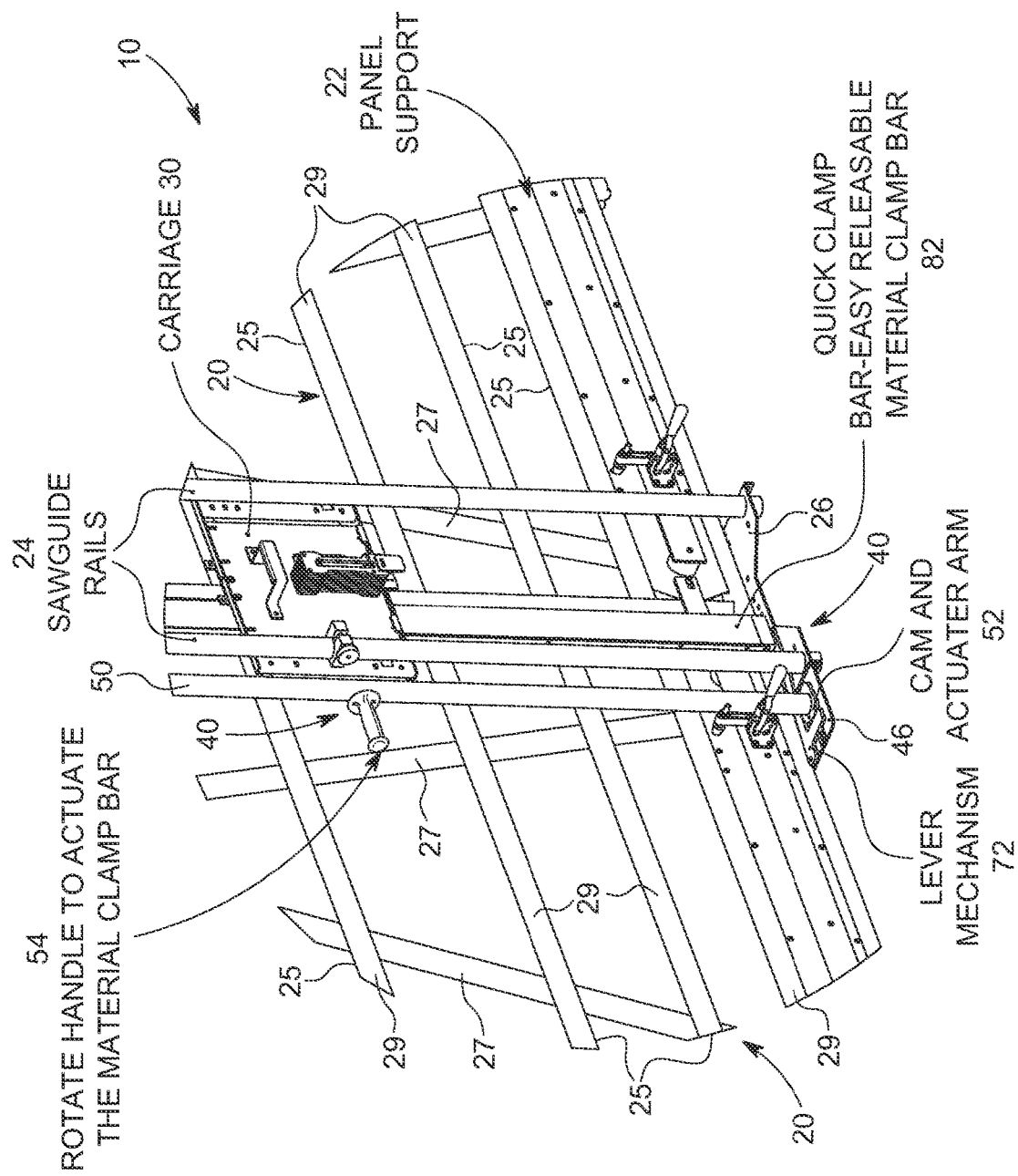
FIG. 1 is a perspective view of the panel cutting device with the improved holding mechanism.

As generally illustrated in FIG. 1, the clamping mechanism 40 is attached to a frame 20 of a panel saw system 10 at a location adjacent a saw carriage 30. As further discussed below, frame 20 is configured to support panels being cut and to assist in cutting operations. Those familiar with panel saws will recognize that a saw (not show) is often carried by saw carriage 30, thus allowing controlled movement. In the illustrated embodiment, the saw carriage 30 will be carried/guided by a set of rails 24 so it can easily move up and down. Guide rails 24 are supported and attached to the frame 20 by support plates 26 positioned at a top and bottom position (i.e. at both ends of guide rails 24). In this embodiment, a panel to be cut (e.g. plastic panel, plywood, or similar type of material configured as a relatively flat panel) is supported on the panel saw system 10 so that desired cuts can be made by simply moving carriage 30 (and attached saw) along rails 24. As illustrated in FIG. 1, frame 20 includes a panel support 22, a number of crossmembers 25 and a number of cooperating uprights 27. In the illustrated embodiment, a front surface of crossmembers 25 creates a supporting surface or facing surface 29 upon which panels can be held. Although reference is made to a saw, a cutting knife or blade could also be used, depending on the materials involved. In certain alternatives, this panel saw could be used in the cutting of plastic panels, plexiglass, foam board, etc. As will be appreciated, the clamping of these "softer" or "more flexible" materials provides significant advantages and helps to more efficiently carry out cutting operations.

To improve operation of the panel saw or cutting knife, clamping mechanism 40 is added so a panel can be securely held in position during cutting operations. The clamping mechanism 40 includes an actuator arm 50 which is rotatably and removably attached to the frame 20 via a bracket 46. A cam 52 is attached to each end of the actuator arm 50. A lever or handle mechanism 54 which is configured to allow rotation of actuator arm 50. Generally, a clamp bar 82 is attached to lever mechanism 72 which carries out a clamping function. All of these components are positioned and configured so that clamp bar 82 will be positioned close to or immediately adjacent to the cutting zone (i.e. the path of the cutting blade). Again, the path of cutting blade is controlled by the configuration of carriage 30 and guide rails 24. In addition, handle 54 is accessible by a user, but is positioned outside of the cutting area, thus providing an additional level of safety. Further, all components are designed so that the clamp bar 82 is easily removable so that alternative cutting operations can be completed and potential interference is avoided.

Figure 4:
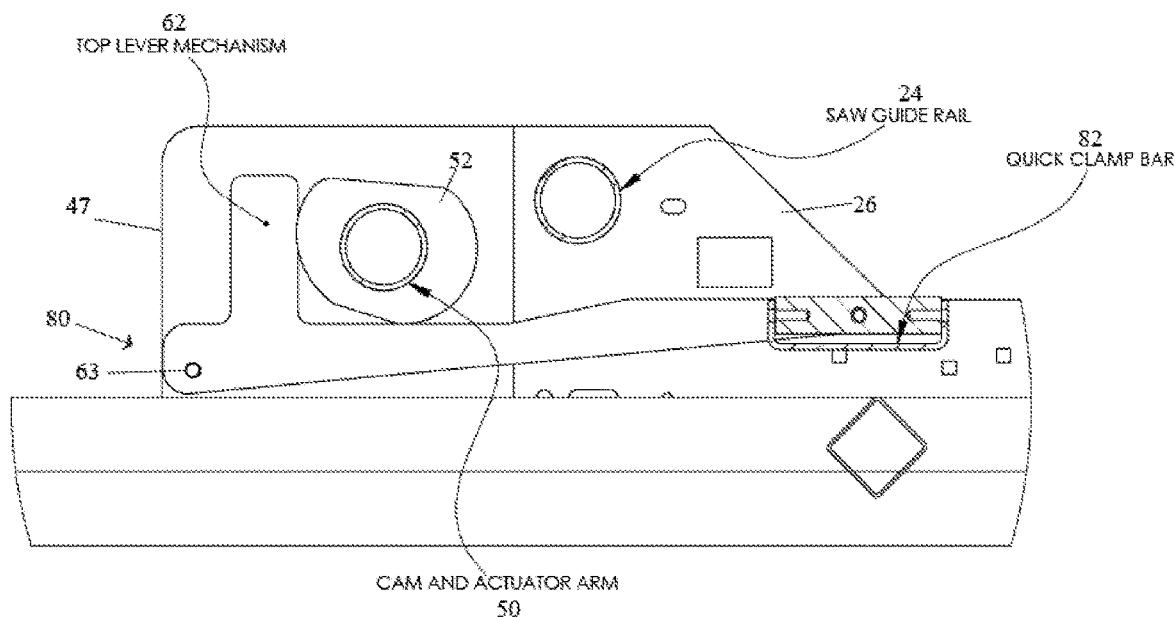
FIG. 4 is a view of the top of the holding bar mechanism looking from the bottom.
Figure 5:
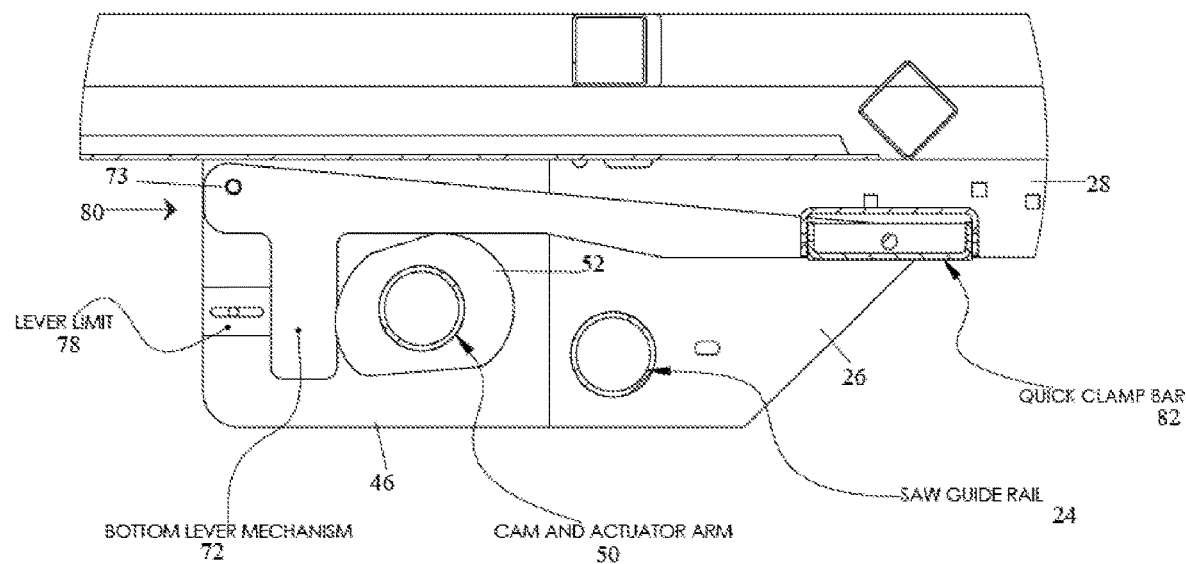
FIG. 5 is a view of the bottom of the holding bar mechanism looking from the top.
Figure 6:
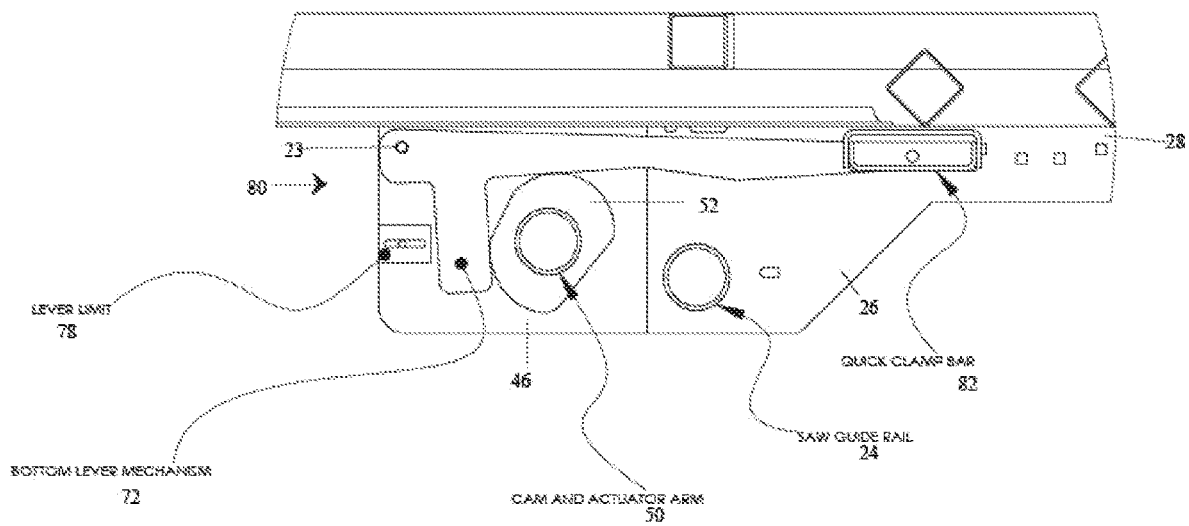
FIG. 6 is a view of the bottom of the holding bar mechanism looking from the top with the holding bar mechanism in the locked position.

In use, handle 54 allows a user to rotate actuator arm 50, which will also cause rotation of cams 52. The cams 52 are specifically designed and fabricated to interact with lever mechanisms 62, 72, and thus cause clamp bar 82 to move into a locked position when desired. Similarly, clamp bar 82 can be moved to the unlocked position by rotating the actuator bar 50 in the opposite direction. Referring now to FIGS. 4-6, details of clamping operations can be better seen. FIGS. 4 and 5 show the top portion and bottom portion, respectively, of the clamping system 80. Again, a single actuator arm 50 is coupled between these two systems. In essence, the top portion (illustrated in FIG. 4) is a mirror image of the bottom portion (illustrated in FIG. 5). As can be seen, cams 52 are both attached to opposite ends of actuator arm 50. Bottom lever mechanism 72 is attached to framework bracket 46 at a pivot point 73. Similarly, top lever mechanism 62 is attached to framework bracket 47 at a pivot point 63.

As generally discussed above, actuator arm 50 is rotatably coupled to framework brackets 46 and 47 and can be operated using handle 54. Rotation of actuator arm 50 causes related movement of cams 52, which are permanently attached to actuator arm 50. As shown, cams 52 have an irregular shape, thus causing forces to be applied to top lever mechanism 62 and bottom lever mechanism 72 when actuator arm is rotated. In both FIGS. 4 and 5, clamp bar 82 is shown in the open or unlocked or unclamped position and held in place by a lever limit 78. By contrast, referring to FIG. 6, actuator arm 50 and cams 52 have been rotated causing lever mechanism 72 to rotate. This movement of lever mechanism 72 causes clamp bar 82 to move into the closed or locked or clamped position. Again, this closed or locked position is best illustrated in FIG. 6.

To provide efficiency, clamp bar 82 is designed to clamp the full length of the material being cut against facing surface 29 (i.e. front surfaces of cross members 25) in a uniform manner. Although not required, it is helpful if this clamping can occur immediately adjacent the cutting zone, to make cutting operations more efficient. In one example, the clamp bar 82 is positioned within inches of the cutting zone and parallel to the cutting path.

Figure 2:
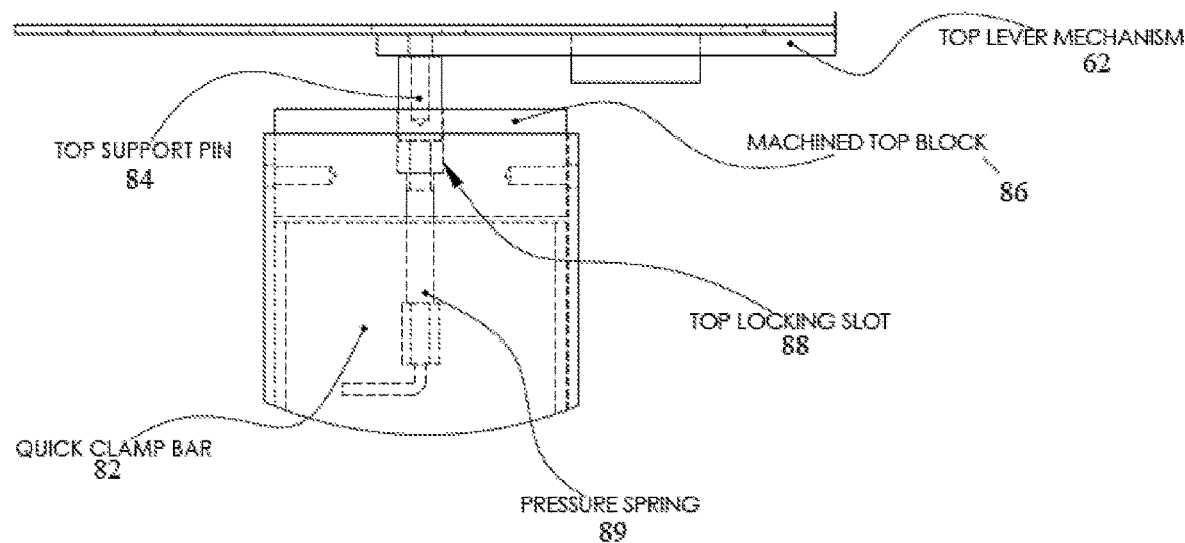
FIG. 2 is a back view of the top end of the holding bar mechanism.
Figure 3:
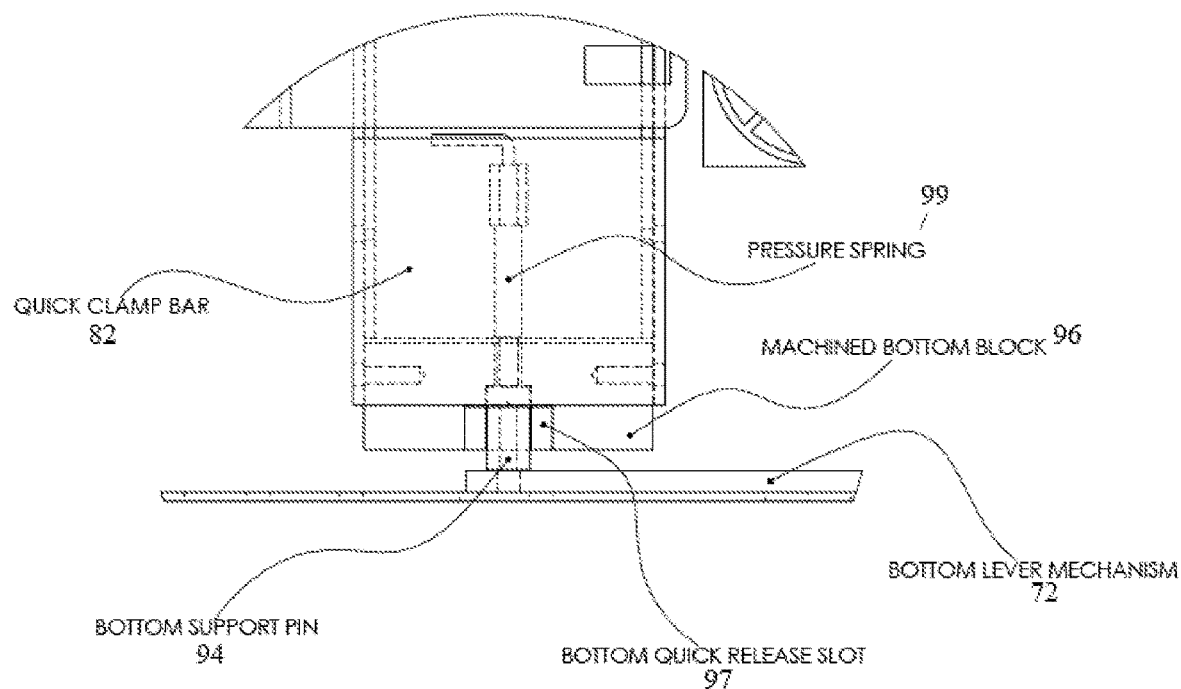
FIG. 3 is a back view of the bottom end of the holding bar mechanism.

In addition to the details above, clamp mechanism 40 was designed for easy removal, thus allowing the machine to perform other cutting applications which may not benefit from the clamp, including both horizontal and vertical cutting operations. As an example, the cutting of plywood, rigid plastic panels, or thicker material may not require the use of the clamp to obtain efficient cuts. In the disclosed embodiments, the removal and/or reinstallation of the clamp can be done in a matter of seconds. Referring to FIGS. 2 & 3, machined blocks 86, 96 on each end of the clamp bar 82 are slotted to except a pin 84, 94 that is connected to the main structure. These machine blocks include a pressure spring 89, 99 that can be pushed in to exert pressure on one end, which allows the other end of the clamp bar 82 to be removed. A top locking slot 88 is included in upper machined block 86 to accommodate this movement. Similarly, a bottom quick release slot 97 is included in machined bottom block 96.

As discussed above, the clamping mechanism described in the identified embodiment makes use of a rotatable actuator arm having cams 52 attached to each end which interact with lever mechanisms 62, 72 and to cause movement. With clamp bar 82 attached to an end of lever mechanisms 62, 72, this creates the desired movement between the closed or locked position, and the open or unlocked position. Those skilled in the art recognized that alternative schemes could be utilized. For example, gears, levers or other movement mechanism could be possible. In such an alternative mechanism, a lever could be used to create straight line movement of components, which could then be translated into movement of a related clamp bar between an unlocked position and a locked position.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A panel cutting saw configured to support and hold panel material while the panel material is being cut, the panel cutting saw comprising:
   a support framework having a facing surface and a panel support, the facing surface configured to allow the panel material to be placed adjacent to the facing surface, and the panel support configured to support the panel material during cutting operations;
   a cutting carriage configured to support a cutting blade, the cutting carriage carried by a pair of guide rails which causes the cutting carriage to follow a carriage path as the cutting carriage moves up and down the guide rails, wherein the guide rails are coupled to the support framework; and
   a panel clamping mechanism for holding the panel material against the facing surface of the support framework in a position adjacent the facing surface, the clamping mechanism comprising:
   an actuator arm rotatably coupled to the support framework, the actuator arm having a first cam at a bottom end and a second cam at a top end;
   a first lever mechanism coupled to a lower portion of the support framework and positioned adjacent to the first cam, wherein rotation of the first cam creates movement of the first lever mechanism;
   a second lever mechanism coupled to an upper portion of the support framework and positioned adjacent to the second cam, wherein rotation of the second cam creates movement of the second lever mechanism; and
   a clamping bar coupled to the first lever mechanism and the second lever mechanism; wherein movement of the first and second lever mechanisms causes related movement of the clamping bar.

2. The panel cutting saw of claim 1 wherein the clamping bar is removable.

3. The panel cutting saw of claim 2 wherein the clamping bar is coupled to the first lever mechanism and the second lever mechanism using a pair of spring loaded pins.

4. The panel cutting saw of claim 1 wherein the clamping bar is adjacent to and parallel with the carriage path when the clamping bar is engaged with the panel material.

5. The panel cutting saw of claim 1 wherein the clamping bar is movable between a locked position to hold the panel material to be cut, and an unlocked position wherein the clamping bar is clear from the panel material to be cut.

6. The panel cutting saw of claim 5 wherein when the clamping bar is in the unlocked position, the first lever mechanism is in contact with a lever limit.

7. The panel cutting saw of claim 1 wherein the carriage is configured to carry a cutting blade which is a straight blade.

8. The panel cutting saw of claim 1 wherein the carriage is configured to carry a cutting blade which is a powered cutting blade.

9. A panel cutting saw comprising:

a frame having a facing surface and a panel support, the frame configured to support a panel to be cut;

a cutting carriage configured to carry a cutting device;

guiderail coupled to the frame and movably coupled with the cutting carriage to allow the cutting carriage to travel along a length of the guiderail, wherein the guiderail and cutting carriage are configured so that the cutting carriage travels along a carriage path which is parallel to the guiderail; and a clamping system coupled to the frame at a position adjacent the guiderail, the clamping system comprising an actuating system and a holding bar, with the holding bar being movable between an open position and a holding position, and the actuating system is operable by a user to cause the holding bar to be movable between the open position and the holding position, the actuating system further comprising an actuator arm, a first cam, a second cam, a first lever mechanism, a second lever mechanism, and a handle, wherein the actuator arm is rotatably coupled to the frame and has first end and a second end, the first cam attached to the first end of the actuator arm, the second cam attached to the second end of the actuator arm, the first lever mechanism coupled to the frame at a position adjacent the first cam, the second lever mechanism attached to the frame at a position adjacent the second cam, and the handle attached to the actuator arm such that movement of the handle causes rotation of the actuator arm, thereby causing movement of the first cam and the second cam; and wherein the first lever mechanism and the second lever mechanism are further coupled to the holding bar, wherein the rotation of the actuator arm and the movement of the first cam and the second cam create movement of the first lever mechanism and the second lever mechanism thereby causing the holding bar to move between the open position and the holding position.

10. The panel cutting saw of claim 9 wherein the holding bar is removable.

11. The panel cutting saw of claim 9 wherein the holding bar is removably coupled to the first lever mechanism and the second lever mechanism using a pair of spring-loaded pins.

12. The panel cutting saw of claim 11 wherein the holding bar is adjacent to and parallel with the carriage path when the holding bar is in the holding position.

13. The panel cutting saw of claim 9 wherein the carriage is configured to carry a cutting blade which is a straight blade.

14. The panel cutting saw of claim 9 wherein the carriage is configured to carry a cutting blade which is a powered cutting blade.

15. The panel cutting saw of claim 9 wherein when the holding bar is in the open position, the first lever mechanism is in contact with a lever limit.

* * * * *